United States Patent
Adriaenssen

[19]

[11] Patent Number: 5,833,847
[45] Date of Patent: Nov. 10, 1998

[54] APPARATUS FOR THE FILTRATION OF INDUSTRIAL LIQUIDS AND GASES

[76] Inventor: Luc Adriaenssen, Chemin du Puits, Boite postale 8, F-06330 Roquefort-les-Pins, France

[21] Appl. No.: 491,982

[22] PCT Filed: Nov. 17, 1994

[86] PCT No.: PCT/FR94/01342

§ 371 Date: Jul. 17, 1995

§ 102(e) Date: Jul. 17, 1995

[87] PCT Pub. No.: WO95/13854

PCT Pub. Date: May 26, 1995

[30] Foreign Application Priority Data

Nov. 19, 1993 [FR] France ................................. 93 14076

[51] Int. Cl.⁶ .................................................. B01D 35/30
[52] U.S. Cl. ......................... 210/232; 210/440; 210/442; 210/450; 210/453
[58] Field of Search .................... 210/435, 440, 210/442, 443, 450, 455, 232, 453

[56] References Cited

U.S. PATENT DOCUMENTS

| | | | |
|---|---|---|---|
| 2,525,287 | 10/1950 | Cuno | 210/443 |
| 2,554,748 | 5/1951 | Lewis et al. | 210/440 |
| 2,559,267 | 7/1951 | Winslow et al. | 210/440 |
| 2,620,071 | 12/1952 | Zenick | 210/450 |
| 3,306,711 | 2/1967 | Wilhelm | 210/443 |
| 3,384,241 | 5/1968 | Nostrand | 210/315 |

FOREIGN PATENT DOCUMENTS

WO 91/05596  5/1991  WIPO.
WO 92/04960  4/1992  WIPO.

*Primary Examiner*—Matthew O. Savage
*Attorney, Agent, or Firm*—Young & Thompson

[57] ABSTRACT

Apparatus for filtering industrial liquids and gases by separation of suspension particles based on the principle of radial stationary filtering. The filtering apparatus comprises a cover (9), a body (6) and a base (19) whose volume is adjustable by altering the length of its body (6). A threaded rod is provided for sealing the unit and also for providing a sealed joint between a filter element (4), the cover (9) and the base (19). The threaded rod (2) can be tightened and untightened using a butterfly handle (11) without the use of other threaded connections. Depending on the liquid or the gas to be filtered, the filter medium will be made from towel-type paper or felt. The filter elements (4) come in a single size and a spacer device (22) is used to provide different lengths. The liquid or gas to be filtered is conveyed by a conical transmission conduit (16) past a circular rib (13) into the outer peripheral zone of the filter chamber (5). It then transits through the filter element (4) at right angles to the different layers of the latter to emerge in the central shaft (3). The filtered liquid or gas is discharged through a conical discharge pipe (18) through radial channels (12) and axial channel (21) in the threaded rod (2). The filtering apparatus of the invention provides, in particular, an effective, low cost solution to the problems of industrial filtering, with an objective of quality, long service life of industrial gases or liquids, or for ecological purposes.

6 Claims, 3 Drawing Sheets

APPARATUS FOR THE FILTRATION OF INDUSTRIAL LIQUIDS AND GASES

BACKGROUND OF THE INVENTION

The filtration of liquids and gases, in industrial, medical and other applications, retains the particular attention of manufacturers of equipment and peripherals because clean liquids and gases increase the performance-quality of machinery, they prolong their usefull life and diminish the cost of maintenance.

Keeping liquids and gases clean will also increase the usefull life of cleaners, coolants, lubricants, etc., and this decreases the volume of used liquids and gases to be retreated and/or to be disposed of.

A great number of patents have been laid down in different fields to define filtration housings, most often limited in use to one particular application (e.g. motor oil filtration such as in patents by Robert Bosch GmbH-EP 0 433 664A1/EP 0 528179A1, or by Herbert Jainek-EP 0 547291A1, or by NTZ Ölfiltertechnik GmbH-EP 0 393393A1), or to define improvements and/or manufacturing methods for filtration cartridges for specific applications and/or fineness of filtration Filterwerk Mann & Hummel GmbH-2 448379, Hermann Trabold-WO 92/04960, Roman Semkow-2 550709A1, Filtration SA-2 490969, NTZ Ölfiltertechnik GmbH-2 624397, Precision Méchanique Labinal sa-2 570287), various installation schemes (Pall Corporation-2 550709A1), or filtration cartridges of variable size but limited concept to an axial filtration (Charles Sims-WO 91/05596).

The comparative survey during the conception of this invention has recognized some 220 patents in international class BO1D wherein are defined the filtration processes by separation of solid/liquids and solids/gas.

In all these patents the problem of filtration has not been studied in a general form, i.e. the filtration of solids in suspension in a liquid or in a gas, in various filtration applications of oil-based solution, waterbased solutions and gases, taking further into account the variable volumes to be filtered and the various finesses to be achieved.

With the upcome of a more widespread environmental awareness the industries, users and manufacturers have an increased need for a filtration unit which is reliable, adaptable in volume, in fineness and in applications, being economical at the same time.

The installation should be easy and the replacement of the filtration cartridges should be uncomplicated.

All these market-imposed criteria were taken into account during the conception of the filtration units with cartridges described in the present invention, respecting the economical and environmental imperatifs as well.

The concept of the filtration apparatus handles variable volumes in that the filter housing is of a variable capacity which implies the definition and the development of filtration cartridges of variable size.

This development takes into account the various liquids and gases to be filtered which implies the development of adapted filtration materials.

This development takes into account the various applications, fixed or autonomous, which implies the definition and the development of units to be fixed on a machine or in complete autonomy.

This development takes into account the different peripherals for these fited or autonomous operations.

This development takes into account the economical and manufacturing aspects which determine the cost for the end-user, by using an important number of components and sub-assemblies readily available.

SUMMARY OF THE INVENTION

This invention describes a filtration apparatus to be used for the separation of particles in suspension in liquids and in gases, with a variable capacity of volume, with an adaptable fineness of filtration and with specific filtration materials to be integrated in the housing for the filtration of specific liquids or gases.

The filtration of liquids and gases by separation is normally done by using different apparatus for each liquid or gas and for each type of filtration particles in suspension.

The filtration fineness in each application may vary from a normal filtration (to particles of approx. 30 $\mu$) to a micro-filtration (to particles of approx. 0.5 $\mu$).

The main principles of stationary filtration by transit of the liquids or gases through a filtration material are: axial, filtration and radial filtration.

The principle used in present invention is radial, filtration, whereby the liquid or gas is forced through the filtration material in a perpendicular direction.

Since a complete guarantee of transit the total quantities of liquids or gases is of essential, it must be physically secured that the filtration material is the only possible way of transit for the liquids or gases.

This radial filtration is obtained with a filtration apparatus of variable size, and therefore variable volume, to be flexible with respect to the quantities or liquids or gases to be filtered per unit time.

This variable size, and therefore variable volume, is obtained without any modification to the upper and lower parts of the filtration unit, but solely by adapting the length of the filter-housing.

This variable size and therefore variable volume of the filtration apparatus is only valid with constant parameters of the liquid or gas and with constant fineness of filtration.

The thus obtained variable size, and therefore variable volume, enables the filtration apparatus to filter a variable quantity per time unit of a given liquid or gas to a given filtration fineness.

The variable fineness is obtained by increasing or decreasing the diameter of the filtration material and therefore of the filter housing, to adapt the indepth filtration.

The filtration apparatus described in this invention uses a maximum number of elements readily available in order to increase the economical returns, the filtration materials are made of recycled and recyclable materials to respect the economical and environmental objectives.

The advantages of the filtration apparatus described in this invention are economical in that the quality of the liquids and/or gases, as used among others in the industry, is improved and their useful life is extended; the advantages are also environmental in that the liquids or gases can be filtered before retreatment and/or destruction.

BRIEF DESCRIPTION OF THE DRAWINGS

The filtration apparatus described in this invention has two main parts:
the filter housing as seen in FIGS. 1 and 2
the filtration material as depicted in FIGS. 1 to 4
The filter housing has three parts: the corpus (6), the upper cover (9) and the lower cover (19).

During development the filter housing has been tested zip to an internal pressure of 25 bars for a duration of 6 hours.

Figure 1:
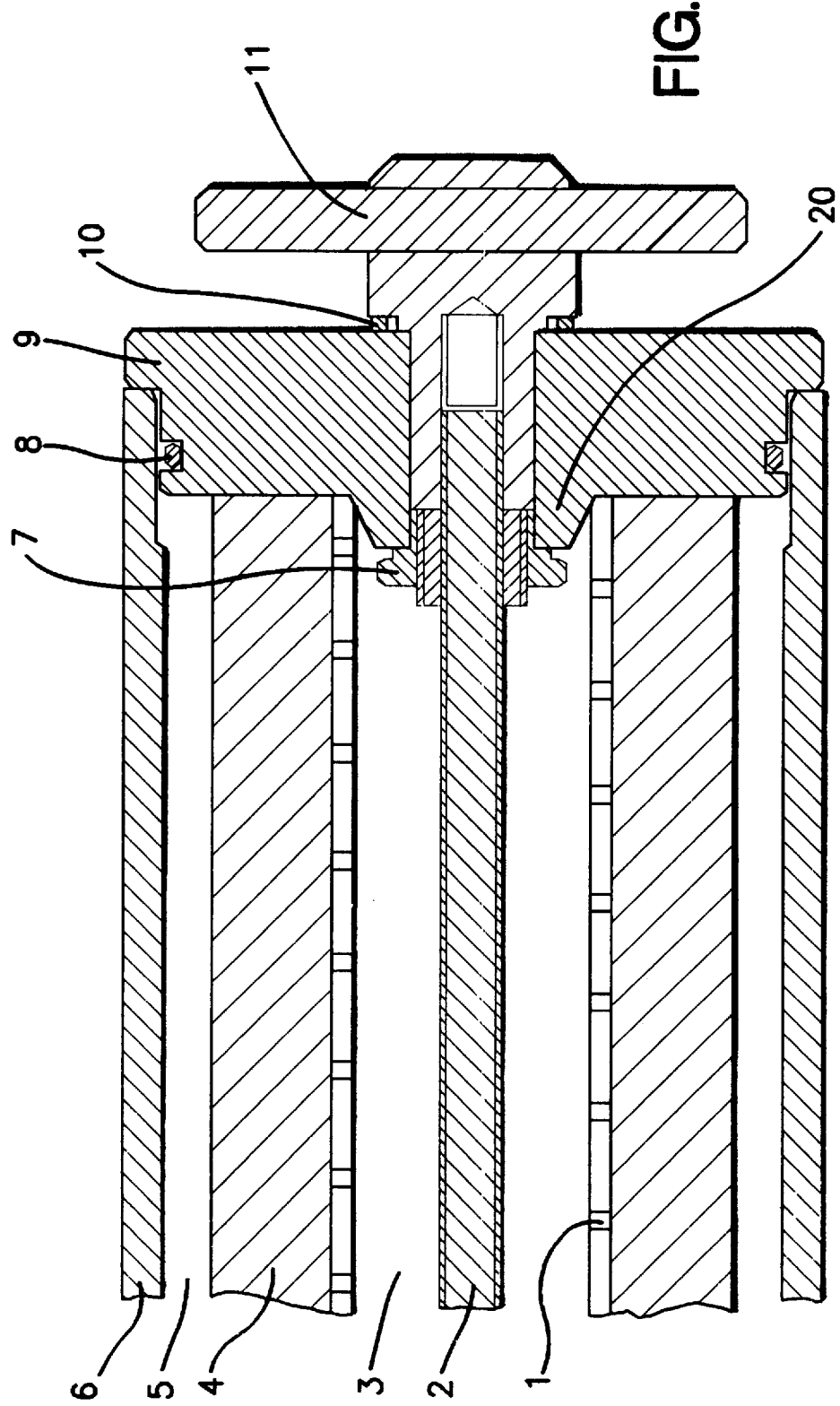
Figure 2:
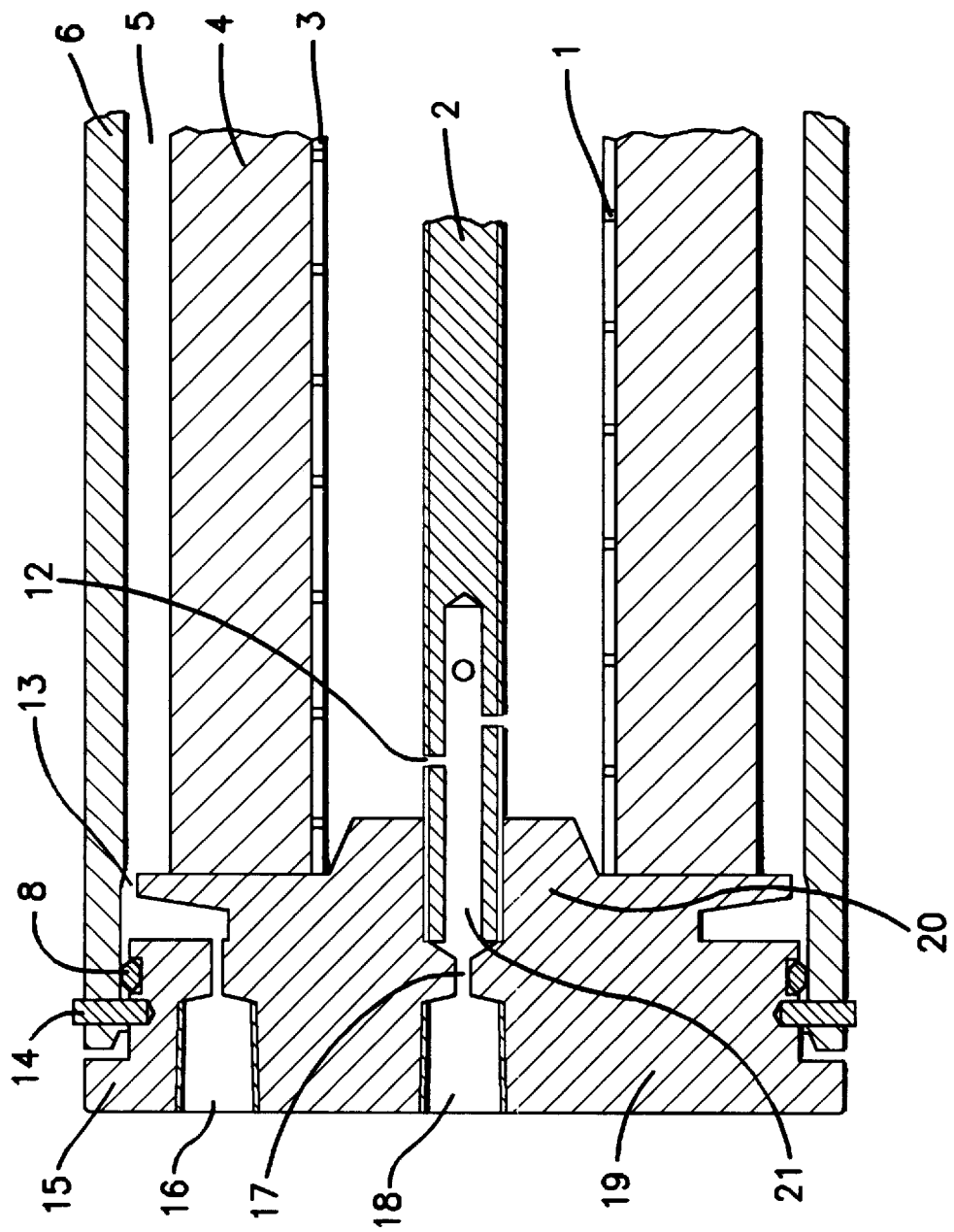
Figure 3:
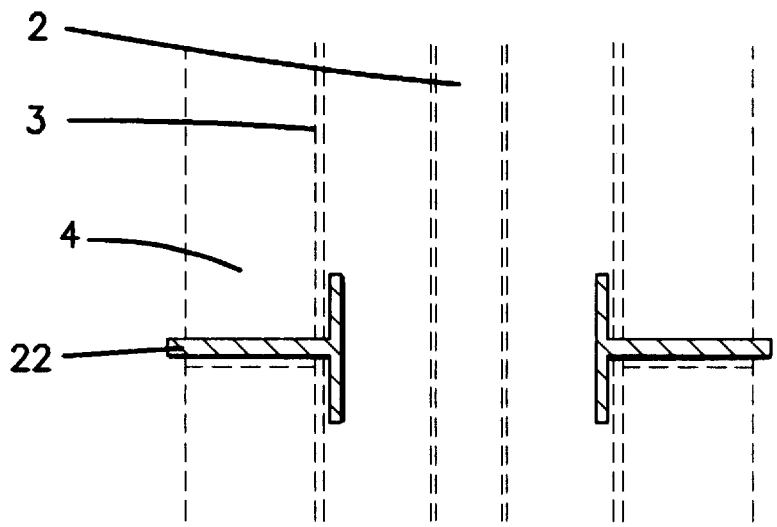
Figure 4:
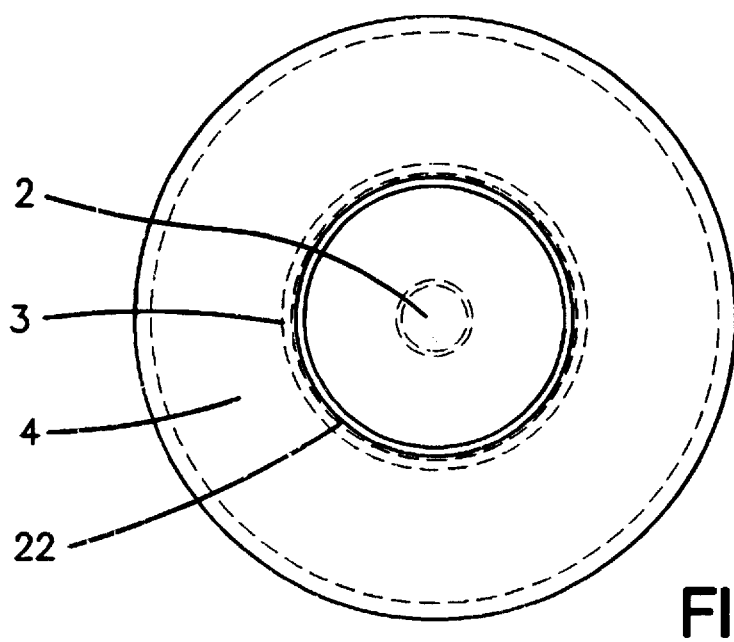

The corpus of the filter housing (6) is the filtration chamber. The form is cylindrical to resist to pressure, length and diameter are variable according to parameters of volume and fineness of filtration respectively.

It is made as an aluminum tube, with a possible variation in plastic, machined and rounded on the inside to avoid deposits.

The length of the corpus (6) determines the volume of the filtration chamber and therefore the quantity of liquid or gas that can be filtered per unit time for a given liquid or gas with constant fineness.

The diameter of the corpus (6) determines the diameter of the filtration material (4) and therefore the fineness of filtration in the used technology of radial filtration.

The upper cover (9) of the filter housing is cylindrical and adapted to the diameter of the corpus of the filter housing. It is made of aluminum, with a possible variation in plastic, either machined or injected.

Its function is to hermetically seal the upper side of the corpus (6) of the filter housing with an easy opening by butterfly bolt (11) to facilitate the exchange of the filtration cartridge (4) after the latter is completely blocked by particles.

The complete closure of the upper side of the corpus (6) of the filter housing is done by a O-seal (8) and an hermetic seal (10).

The filtration cartridge (4) is kept in the center of the corpus (6) of the filter housing by a conical protuberance (20).

The perfect and hermetic closure between the upper cover (9) and the filtration cartridge (4) is guaranteed by means of a central threaded bar (2) mounted and fixed in the lower cover (19) which compresses via a butterfly bolt (11) the upper cover (9) to the lower cover (19) and therefore the filtration cartridge (4).

The lower cover (19) of the corpus (6) of the filter housing is cylindrical and adapted in diameter to the corpus (6) of the filter housing. It is made of aluminum, with a possible variation in plastic, either machined or injected.

Its function is to hermetically seal off the lower side of the corpus (6) of the filter housing, to provide the inlet for the liquid or gas to be filtered via a conical aperture (16) and the exit of the filtered liquid or gas via a conical aperture (18).

The complete closure of the lower cover (19) of the corpus (6) of the filter housing is achieved with an O-seal (8) and firmly held in place by two or more split pins (14).

The filtration cartridge is kept in the center of the corpus (6) of the filter housing by a conical protuberance (20).

A central threaded bar (2) fixed in the lower cover (19) allows the compression of the filtration cartridge (4), to ensure its hermetic sealing, between the lower cover (19) and the upper cover (9) which has to remain easily removable by means of a butterfly bolt (11).

The liquid or gas to be filtered is equally distributed over the total external volume (5) by a circular conduit (13) machined in the perimeter of the lower cover (19).

A conical and threaded aperture (16) in the perimeter of the lower cover (19) is the inlet of the liquid or gas to be filtered. This inlet has a narrowing (15) in order to regulate the pressure of the liquid or gas to be filtered inside the filtration chamber and also to avoid pressure-drops in the circuits of machinery, engines, etc.

The second function of this narrowing (15) is to avoid brutal changes in pressure of the liquid or gas to be filtered on the filtration cartridge (4). These pressure changes would indeed, by a sort of sponge-effect allow particles in suspension to pass through the filtration material, which would result in a less than perfect filtration.

The inside threading of the conical inlet aperture (16) is standardized to allow the use of industrial couplings.

A conical and threaded aperture (18) in the center of the lower cover (19) is the outlet of the filtered liquid or gas. This outlet has a narrowing (17) to maintain a differential pressure between the outside and the inside of the filtration cartridge (4) in order to ease the transition of the liquid or gas to be filtered.

The outlet canal (17) is in contact with the support tube (3) of the filtration cartridge by means of an axial hole (21) in the central threaded bar (2) of at least 10 millimeters above the upper side of the lower cover (19). Radial holes (12) connect the inner space of the support tube of the filtration cartridge with the afore described axial hole (21) and thus with the outlet canal (17).

In this way the obstruction of the outlet canal (17) by particles is avoided. The inside threading of the conical outlet aperture (18) is standardized to allow the use of industrial couplings.

The filtration material adapted to the filtration apparatus as described in this invention is chosen in function of the liquid or gas to be filtered but it respects always the basic criteria of radial filtration and is always adapted to the form of the filter housing (6):

to obtain a stationary radial filtration it is necessary that the total quantity of liquid or gas to be filtered transits perpendicularly through the layers (of the filtration material (4).

It is also necessary that a perfect sealing is made between the filtration material (4) and the upper (9) and lower cover (19). This perfect sealing by means of a threaded central bar (2) is described above.

A minimal differential pressure of 1 to 2 bars is necessary to ensure a regular transit of the liquid or gas to be filtered through the layers of the filtration material (4); the volume per time is a function of this differential pressure, the viscosity, of the fluid or gas to be filtered and the fineness of filtration being constant The thickness of the filtration material (4), in practice the number of layers, is the parameter for the filtration fineness, i.e. when the filtration material is thicker, or when the number of layers is bigger, the quality of filtration, or filtration fineness, will be better.

since the corpus of the filtration apparatus, which is at the same time the filtration chamber, is cylindrical force reasons of pressure-resistance, the filtration material (4) will have the same form.

The different filtration materials of the filtration apparatus described in this invention are made as cylinders, with concentric layers of filtration material, adapted to the specific fluids or gases to be filtered.

The transit of liquids or gases to be filtered is from external to internal through the filtration cartridge. In the center a support tube (3) with sufficient diameter in respect to the volume of filtered liquids or gases, allows the outflow of the filtered liquid or gas.

The central support tube (3) is cylindrical with a diameter adapted to the volume of filtered liquid or gas to pass through. Over its surface are drilled a number of holes (1) with a total surface sufficient to evacuate the volume per time unit of filtered liquid or gas under a given pressure. The holes (1) are drilled in opus incertum on the surface of the central support tube (3).

The filtration material (4) will be cellulose paper, double layers—2×20 grammes per sqm, or single layer—40 grammes per sqm, also known as napkin paper, for the filtration of gases and oil-based liquids.

The minimal total thickness of the filtration material (4) will be 15 millimeters or 230 layers for the filtration of gases to particles of $0.5\mu$.

This total minimal thickness will be 20 millimeters or 280 layers for the filtration of oil-based liquids to particles of $0.5\mu$.

The filtration material will be unwoven fibres, also known as felt, with thermofixing on the internal surface, 200 grammes per sqm. for the filtration of water-based fluids.

The minimal total thickness of this filtration material will be 13 millimeters or 6 layers for the filtration of water-based fluids to particles of $1\mu$.

The filtration cartridges (4) will be modular by means of an end plate (22) to allow for the assembly of a number of standardized filtration cartridges, always with respect to the perfect sealing of the filtration elements, as is absolutely required for the radial filtration as set forth in this invention.

This standardized size of the filtration cartridges will depend on the standard breath as available from suppliers for each filtration material.

Therefore the manufacturing of the filtration cartridges will be extremely economical, since they are standardized.

Further to its original concept the filtration apparatus as described in present invention, may be used in various applications, not all included in drawing, by means of standard couplings to other industrial equipment. The final utility will therefore be greatly extended.

As an example, the autonomous filtration group using the filtration apparatus as described in this invention, allows for filtration without external pressure generation replaced by an electric pressure pump, a set of differential pressure switches and a pressure gauge and a standard on/off switch.

The electric pressure pump will supply the necessary external pressure of 1 to 4 bars.

The differential pressure switches will monitor the pressure fall between entrance and exit of fluids and gases. They will cut of the electric pump as soon as the pressure fall exceeds a certain set value.

This would mean that the filtration element is completely blocked with particles and does not allow the normal transit of liquid or gas to be filtered.

In this way the autonomous filtration group allows for a stand-alone use without human presence.

I claim:

1. Filtration apparatus for separating solid particles suspended in a fluid, by the principle of stationary radial filtration through a filtration material, the apparatus comprising:
    an aluminum cylindrical upper cover;
    an aluminum cylindrical body having an upper open end and a lower open end and defining a filtration chamber containing a filtration material;
    an aluminum cylindrical lower cover;
    means for releasably attaching said upper cover to the upper open end of said body;
    inlet means for admitting fluid to be filtered;
    outlet means for removing filtered fluid;
    said inlet and outlet means comprising apertures traversing said lower cover;
    sealing means for sealing the lower cover to the lower open end of said cylindrical body;
    said lower cover not having any threads on its outside perimeter, said body not having any threads on its outer perimeter, said lower cover being fixed to said body with split pins.

2. Filtration apparatus according to claim 1, wherein said means for releasably attaching the upper cover a butterfly bolt threadedly attached to a counter bolt on a threaded central rod which is attached to said lower cover.

3. Filtration apparatus according to claim 2, wherein the filtration material is completely sealed to the upper cover and the lower cover by compression applied by said central threaded rod.

4. Filtration apparatus according to claim 1, further comprising a conical protuberance on the upper cover and on the lower cover for ensuring essential stability of the filtration material.

5. Filtration apparatus according to claim 1, wherein the filtration material is selected from the group consisting of napkin paper, and felt.

6. Filtration apparatus according to claim 1, wherein the filtration material is in the form of a cartridge when said apparatus further comprises end plates for assembling the cartridge.

* * * * *